United States Patent [19]

Gnaedinger

[11] 4,209,267

[45] Jun. 24, 1980

[54] EMERGENCY SAFETY SYSTEM

[76] Inventor: John P. Gnaedinger, 160 Sheridan, Kenilworth, Ill. 60043

[21] Appl. No.: 943,155

[22] Filed: Sep. 18, 1978

[51] Int. Cl.$^{2}$ .................................................. B65G 5/00

[52] U.S. Cl. .......................................... 405/53; 62/45; 62/260; 137/236 R; 137/312; 220/18; 220/88 R

[58] Field of Search ........................... 405/52, 53, 54, 55, 405/56; 220/18, 88 R; 137/312, 236; 62/45, 260

[56] References Cited

U.S. PATENT DOCUMENTS

| | | | |
|---|---|---|---|
| 3,517,513 | 6/1970 | Rensman et al. | 405/52 |
| 3,930,590 | 1/1976 | Ebbrell | 220/18 |
| 3,940,940 | 3/1976 | Barrett | 137/312 |
| 3,952,907 | 4/1976 | Ogden et al. | 405/264 |
| 4,110,947 | 9/1978 | Murray et al. | 405/54 |

*Primary Examiner*—Alexander Grosz
*Attorney, Agent, or Firm*—McDougall, Hersh & Scott

[57] ABSTRACT

An improvement in storage systems for liquefied natural gas or the like to provide increased security in cases of tank rupture. The safety system comprises a dike, impounding wall or drainage channel constructed of compacted earth, concrete, metal and/or other suitable substance surrounding an aboveground steel insulated tank used to store the liquefied gas. A drop shaft is used to communicate the diked area with an underground tunnel for temporary accumulation and subsequent safe disposal of liquid which has escaped from the storage tank.

20 Claims, 4 Drawing Figures

EMERGENCY SAFETY SYSTEM

BACKGROUND OF THE INVENTION

The invention is directed to emergency safety systems for aboveground tanks used to store liquid natural gas or similar flammable or otherwise hazardous material. For convenience, the invention will be described with reference to liquid natural gas (LNG).

With the development of synthetic natural gas and liquefied natural gas, storage tanks to hold the liquefied gas at temperatures of approximately −260° F. are required. Various attempts to store the liquefied natural gas below ground to provide long-term storage have been declared failures. Accordingly, most storage at processing plants and receiving storage is in insulated steel tanks above ground. This represents a potential diaster since during an accidental rupture of such a tank, many thousands of, if not millions of, gallons of LNG could spill.

It is normal practice at such tanks to provide dikes surrounding the tanks in the same manner that such dikes are provided for crude oil and other petroleum product tanks, though design criteria for such dikes are rather general and the dikes cannot contain the vaporized LNG. During a rupture or leak in the storage tank, it has been expected that the diked area will contain the flammable liquid to prevent the liquid from spreading to adjacent facilities on or off the storage area where it might be ignited. Adjoining properties are protected only by an exclusion distance from the dike.

However, unlike other petroleum products, LNG boils at a temperature of −260° F. and thus LNG in the diked area will evaporate quickly while rapidly cooling the structures it is in contact with. The evaporated highly flammable gas is initially heavier than air and will flow as a vapor out of the area surrounding the tank while hugging the ground surface. Dikes have been proposed, but although the dike will prevent the escape of the liquid to the surrounding facilities, it can not prevent the spread of the gases which are also very flammable and, therefore, dangerous.

SUMMARY OF THE INVENTION

This invention generally involves the incorporation within each diked area of one or more drop shafts, which, in the event of a rupture or leak from the tank, would permit the LNG to immediately flow downward into a relatively deep tunnel. The tunnel is constructed laterally in an appropriate underground rock or soil formation and would connect with drop shafts from each of the diked areas of the project site of many tanks. The tunnel would convey the LNG vapors to the flare area of the project and collect the LNG to be pumped back into a storage tank. The diked area and the tunnels are flooded with an inert gas so that contact with the air or sources of ignition are minimized. Evaporation of the LNG in the diked area may be minimized by the use of smooth surfaces and futher retarded by the use of insulating materials on the surface to prevent heat transfer to the LNG.

A system for discharging plastic balls of between 1 and 1½ inches in diameter into the diked area is also contemplated. The balls may be of foam or hollow and filled with inert gas. In the case of a leak or rupture, these balls are floated on the surface of the LNG to minimize evaporation and oxidation of the LNG. The storage tank may also be wrapped with prestressed cable to provide additional strength. This will limit the dimensions of a rupture if the integrity of the tank should be breached.

DETAILED DESCRIPTION OF THE INVENTION

Figure 1:
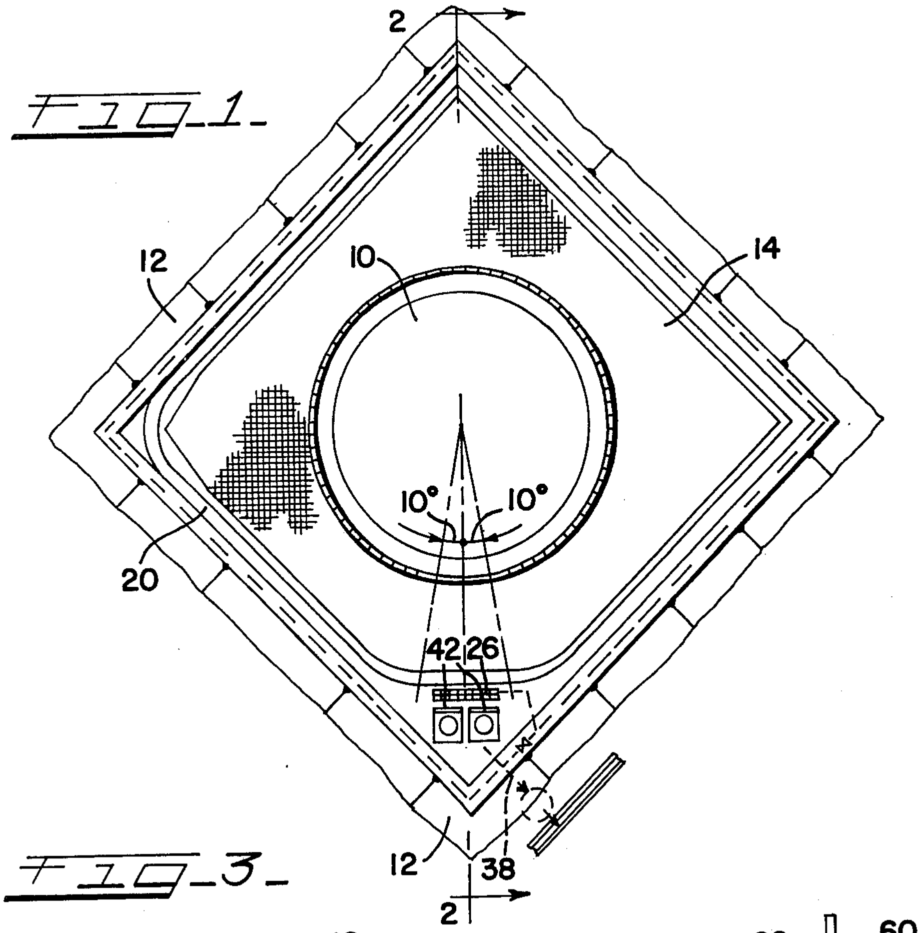
FIG. 1 is a plan view illustrating an LNG storage tank, a surrounding diked area and a drop shaft as contemplated by this invention.
Figure 3:
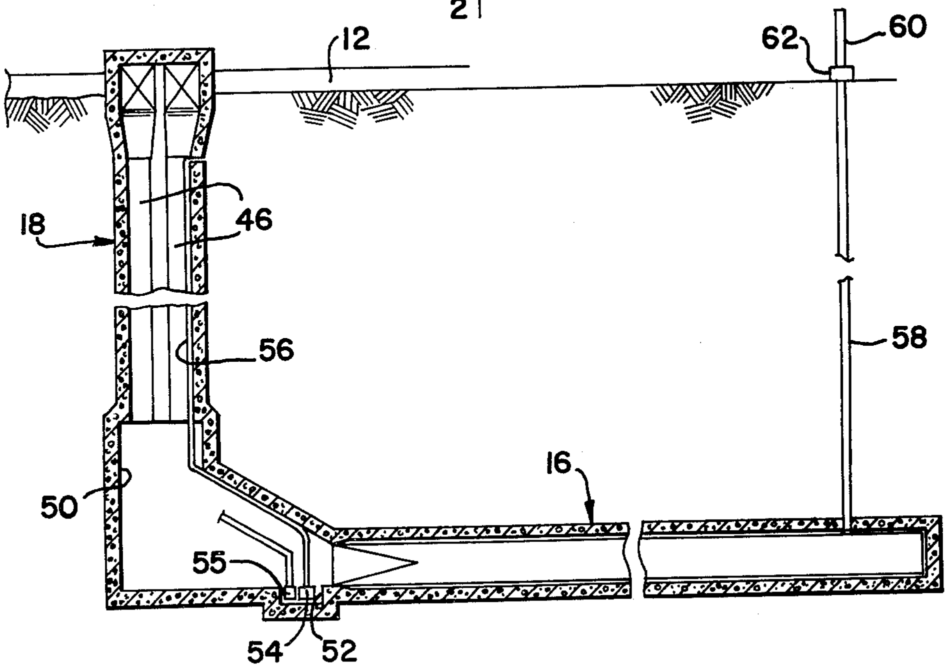
FIG. 3 is a sectional view taken about the line 3—3 of FIG. 2.

The accompanying drawings illustrate an LNG storage tank 10 surrounded by a dike 12. A floor 14 is defined between the dike and the tank.

An LNG temporary storage tunnel 16 is defined below ground. Access to this tunnel is provided through shaft 18, and the upper end of the shaft is in communication with floor 14.

The major portion of the dike 12 may be formed from compacted earth fill of a type typically used in association with earthen dams. This material is built up around and above the floor 14 which may be composed of an insulating concrete. It is preferred that the floor 14 slope from the tank downwardly toward the dike wall. Typically, the slope would be about 0.005 feet per foot.

A gutter 20 is defined in the floor 14 adjacent the dike 12. This gutter extends completely around the dike and terminates at the upper end of drop shaft 18. A slope is also preferably built into the gutter, this slope extending from a point diametrically opposite the drop shaft opening downwardly toward the opening. Typically, this slope will be in the order of 0.01 feet per foot.

The dike 12 defines a with a concave side wall, gush deflector 22 mounted in this location. This deflector also preferably extends around the entire inner periphery of the dike. Fasteners 24 are utilized at intervals for securing the gush deflector in position. Where the system of the invention is used in association with an existing dike, a gush deflector of similar design may be installed inwardly of the dikes as shown.

Figures 2, 4:
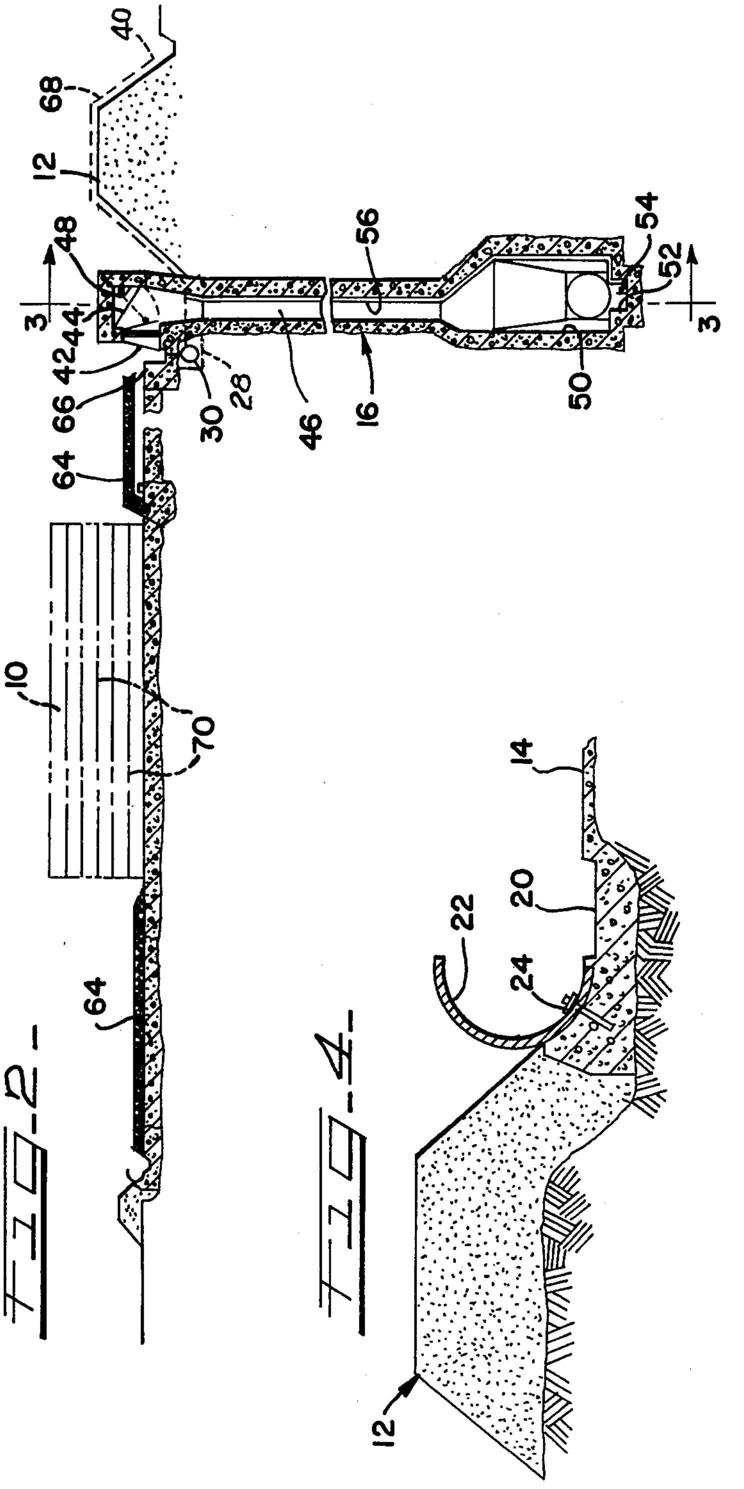
FIG. 2 is a side sectional view of the structure of FIG. 1 taken about the line 2—2 of FIG. 1.
FIG. 4 is a fragmentary, sectional view illustrating a gush deflector construction.

The upper end of the drop shaft 18 is best illustrated in FIGS. 1 and 2. As shown, a grate 26 is located in the floor of gutter 20, and this grate communicates with sump 28 and sump pump 30. This sump pump 30 pumps rain water over the dike to outlet 40 which is positioned on the exterior of dike 12. The grate 26 thus provides for discharge of rain water or the like which will be collected under normal conditions.

Vertically extending racks 42 of conventional design may be utilized adjacent grate 26. These racks will prevent passage of plastic balls, rocks, branches or other large debris into the drop shaft. Such debris can be manually removed on a regular basis to prevent any undue build-up. Where the drop shaft is divided into two vertical shafts as illustrated, a pair of racks 42 may be utilized.

Positioned behind each of the racks 42 is a pivotally mounted flap gate 44. This gate will normally close access to respective vertical shafts 46. A remotely operated hydromagnetic hoist 48 is schematically illustrated in association with the gates 44. As will be appreciated, however, the gates could be spring-loaded and forced open by the weight of LNG, and various other means are also available for opening and closing these gates.

The drop shaft defines an enlarged chamber 50 at its bottom end. A sump 52 is defined in the floor of this chamber, and water pump 54 and LNG pump 55 are located in this sump. To the extent that water is collected in the chamber 50, the pump 54 will deliver the water into pipe 56 which will be discharged through outlet 40.

As illustrated, the walls of drop shaft 18 may be formed of an insulating concrete of the same composition as the floor 12. Similarly, horizontal storage chamber 16 is preferably formed of a material such as an insulating concrete. The chamber 16 is provided with a pipe vent 58 extending to outlet 60. A control valve 62 is associated with the pipe vent for regulating back pressure in the vent as will be more fully explained.

In a suitable mode of operation for the described apparatus, the drop shaft 18 and the horizontal storage chamber 16 are filled with an inert gas, for example, helium gas. This gas is maintained in these areas through the provision of flap gates 44 and control valve 62.

With further reference to a preferred mode of operation, the floor 14 is covered with plastic balls or the like. In the illustration, the balls 64 are provided in several layers on the floor 14. In order to maintain the balls in a suitable position, a nylon cord retention net is positioned over the balls with one edge of the net being anchored adjacent the tank 10, and with the other edge of the net being anchored adjacent gutter 20.

The structure of the invention is utilized in the event of a rupture of tank 10. In the absence of the mechanisms of the invention, this would lead to a discharge of LNG which would spread into the area around the tank. The gas will volatilize at varying rates depending on such factors as temperatures and wind conditions. Since the gas is heavier than air until its temperature rises above −150° F., it will spread at ground level. When ignited, which is virtually inevitable, massive explosions are likely to occur.

The structure of this invention combines to minimize danger of massive explosion and consequent heavy damage in the area surrounding an LNG tank. In the event of a tank rupture with the system of this invention, the LNG will flow outwardly toward the dike 12. The liquid will naturally flow toward the drop shaft 18 where it is delivered downwardly into the inert gas filled chambers 50 and 16.

Various temperature sensitive means are employed for achieving the rapid entry of the liquid into the storage chambers. A first such means may comprise sensors located adjacent gutter 20 in the immediate vicinity of the entry to drop shaft 18. Such sensors may be located at the position designated by the numeral 66 in FIG. 2, and the sensors may be activated by temperatures of minus 150° F. or lower. When such temperatures are encountered by the sensors, it will invariably be caused by the presence of the LNG.

The sensors in this vicinity will serve to operate the hydromagnetic hoist of other mechanisms controlling flap gates 44. This will result in the collection of all LNG in the drop shaft passages 46 and the liquid will be quickly transferred to horizontal storage chamber 16. The water pump 30 may have an associated temperature sensitive shut-off switch or other suitable device so that the liquefied gas will not be discharged outwardly of the system.

Similarly, the water pump 54 operating in the bottom of chamber 50 may be operated by a temperature sensitive means. Thus, when the cold liquid enters the chamber 50, the pump 54 would be deactivated to avoid passage of liquefied gas beyond the periphery of the dike 12. The additional LNG pump 55 will permit removal of liquefied gas from sump 52 to one or more other storage tanks.

As the LNG fills the chambers 50 and 16, there will be a tendency for the gas to escape through vent 58. By providing a relatively small diameter pipe, the escaping gas can be ignited whereby the outlet 60 acts as a flare preventing any concentrated amount of the LNG from entering the atmosphere.

It is contemplated, particularly in the case of a large rupture, that the LNG will flow outwardly from the tank 10 at a rapid rate. The gush deflector 22 diminishes any adverse effects of such liquid movement. Specifically, the gush deflector changes the path of movement of the liquid gas and diverts this liquid back toward the tank or at least into the gutter 20. The gush deflector design prevents splashing of LNG to further insure against passage of the gas beyond the diked area.

The plastic balls utilized in the referred embodiment will float on the surface of the LNG which is discharged from a tank rupture. The balls tend to minimize wave formation or other conditions which could lead to undue splashing of the liquid. Furthermore, these balls achieve the highly significant function of greatly minimizing the exposed surface area of LNG. This, in turn, significantly minimizes the tendency of the liquid to volatilize. More time is thus provided for flow of the liquid into the underground collection chambers. Five layers of the balls may, for example, be used. Teflon is an example of a suitable material.

It is also preferred that the floor 14 comprises a finished concrete surface or similar smooth surface to minimize the rate of evaporation. The smooth surface, in particular, tends to minimize wave formation or other disruption in the flow of the LNG whereby minimum surface area exposure is realized so that a greater percentage will remain in the liquid state for collection.

In order to minimize heat input to the liquid and thereby also minimize evaporation, the floor 14 as well as various shaft walls are insulted. The use of insulating concrete, soil cement cover or similar materials known to those skilled in the art is contemplated.

As discussed, the chambers 50 and 16 are filled with inert gas. Helium gas is particularly contemplated since the helium will seek a higher level than any vaporized LNG and thereby form a barrier between the LNG and the ground. In this same connection, it is contemplated that gas jets be located around the tank 10 and/or around the dike 12. Such jets may be activated upon indication of a rupture to continuously supply helium over the surface of the LNG on floor 14. This will also minimize evaporation. The use of carbon dioxide or nitrogen gas which are heavier than air is further contemplated as a cover for minimizing evaporation of LNG on the floor 14.

Other substances functioning in a manner similar to the plastic balls 64 include plastic sheets or even a liquid which would float on the LNG. Suitable mechanical means are available for discharging such material onto the LNG surface in the event of a rupture.

The invention contemplates the utilization of underground chamber 16 for collecting LNG from one or a plurality of tanks. Similarly, a drop shaft may be in communication with the floor surrounding more than one tank. Suitable communication passages, preferably formed with insulating concrete or similar materials may be employed.

It is also contemplated that in the event of a partial rupture above the bottom of the tank, valves and piping will be provided to transfer the LNG retained in the lower part of the tank to the drop shaft 18.

Passages are also contemplated for transmitting collecting LNG to alternative storage tanks. This is the preferred manner of operation since the valuable LNG can thereby be salvaged. In the absence of means for transferring the LNG to an alternate tank, for example where no storage space being available, or where relatively small amounts of LNG are involved, the flare 60 may be utilized for diposing of the LNG by burning the LNG in a controlled fashion.

In designing the tanks, means may be employed for controlling the outflow of LNG in the event of rupture. It is contemplated, for example, that circumferential cables 70 as illustrated in FIG. 2 could be utilized to strengthen the tank and to at least minimize the size of a rupture.

A typical application of the invention may involve a storage tank 50 feet high and 225 feet in diameter. The inner dike wall will be located about 100 feet from the outer surface of the tank.

The depth of the drop shaft is generally determined by local geologic conditions; however, depths in the order of 50 feet or greater are contemplated for safety reasons. The length of the chamber 16 will vary depending upon the contemplated maximum storage capacity required. Passages as great as 4000 feet are contemplated as typical in view of existing amounts of LNG currently being stored in each tank.

In the illustrated example wherein a pair of drop shafts 18 are located in side-by-side relationship, the inner diameter of the shafts may be in the order of 15 feet. The inner diameter of the chamber 16 is contemplated to be in the order of 30 feet under those circumstances. Other dimensions of structures involved will be determined in accordance with the specific examples given, it being understood that all dimensions may vary considerably depending on the particular installation being serviced.

The system relies on the use of pumps capable of handling LNG and similar materials. Such pumps are available, for example, from J. C. Carter Company of Costa Mesa, California and Cryodynamics, Inc. of Anaheim, California. Other pumps will be utilized for handling water which may collect in the system whereby structures most suited for the particular requirements are utilized. In either instance, pumps capable of operation when submerged are contemplated.

It has been calculated that with the system of this invention, and considering facilities of the magnitude referred to in the foregoing discussions, the LNG can be safely recovered from a ruptured tank in the order of about 20 minutes. When considering evaporation characteristics of the LNG, only about 10 percent will evaporate under normal temperature and wind conditions during this period of time. As indicated, the use of the plastic balls as well as other safeguards will serve to reduce the evaporation rate and thereby compensate for more severe temperature and wind conditions.

It will be understood that various other changes and modifications of the system of the invention may be made without departing from the spirit of the invention particularly as defined in the following claims.

That which is claimed is:

1. In a system wherein liquefied gas is stored in a tank at substantially ground level, the improvement in means for minimizing passage of gas into the atmosphere in the event liquefied gas is discharged from a tank onto the ground, the improved system comprising a retaining dike extending around the tank and spaced outwardly therefrom, a liquefied gas collection shaft defining an inlet and positioned in the area between the dike and the tank, said collection shaft extending a substantial distance below ground level, liquefied gas drainage means for directing liquefied gas over the surface of the ground within the confines of said dike and outside said tank for directing liquefied gas to said collection shaft, and an underground liquefied gas collection chamber communicating with said collection shaft, said collection chamber extending a substantial distance outwardly of said collection shaft and being dimensioned to at least temporarily receive an amount of liquefied gas discharged from the tank commensurate with the amount stored in the tank.

2. A system in accordance with claim 1 including a gush deflector associated with said dike, said gush deflector extending vertically upwardly and inwardly toward said tank whereby liquefied gas engaging the gush deflector is directed back toward the tank and toward said collection shaft.

3. A system in accordance with claim 1 including means for forming a cover at least partially over the liquefied gas discharged from said tank, said cover being formed in the area between the tank and said dike.

4. A system in accordance with claim 1 wherein the surface defined between said tank and said dike comprises an insulating surface adapted to minimize heat transfer between liquefied gas on the surface and the underlying ground.

5. In a system wherein liquefied gas is stored in a tank at substantially ground level, the improvement in means for minimizing passage of gas into the atmosphere in the event liquefied gas is discharged from a tank onto the ground, the improved system comprising a retaining dike extending around the tank and spaced outwardly therefrom, a liquefied gas collection shaft defining an inlet and positioned in the area between the dike and the tank, said collection shaft extending a substantial distance below ground level, an underground liquefied gas collection chamber communicating with said collection shaft, said collection chamber being dimensioned to at least temporarily receive the liquefied gas discharged from the tank, and including a drainage gutter spaced inwardly of said dike, said gutter sloping downwardly toward said collection shaft whereby liquefied gas discharged from the tank is directed to said shaft.

6. A system in accordance with claim 5 including a gush deflector associated with said dike, said gush deflector extending vertically upwardly and inwardly toward said tank whereby liquefied gas engaging the gush deflector is directed back toward the tank for movement into said gutter and toward said collection shaft.

7. A system in accordance with claim 5 wherein the surface defined between said tank and said dike comprises an insulating surface adapted to minimize heat transfer between liquefied gas on the surface and the underlying ground.

8. A system in accordance with claim 7 wherein said surface comprises an essentialy smooth surface to thereby minimize disruption in the flow of liquefied gas from the tank toward said dike.

9. A system in accordance with claim 5 including rack means positioned between said gutter and said collection shaft to prevent entry of debris into the collection shaft.

10. A system in accordance with claim 5 including means for collecting rain water and the like from the area between said tank and said dike, and including means for pumping said rain water outwardly of said dike.

11. A system in accordance with claim 5 including a pipe extending from said chamber upwardly, the passage defined by said pipe communicating with the atmosphere above the ground, said pipe being adapted to vent vaporized liquefied gas from within said chamber.

12. A system in accordance with claim 5 including means for forming a cover at least partially over the liquefied gas discharged from said tank, said cover being formed in the area between the tank and said dike.

13. A system in accordance with claim 12 including a plurality of plastic balls normally positioned on the floor defined between said tank and said dike, said balls floating on liquefied gas discharged from said tank to thereby minimize surface are exposure of the liquefied gas.

14. In a system wherein liquefied gas is stored in a tank at substantially ground level, the improvement in means for minimizing passage of gas into the atmosphere in the event liquefied gas is discharged from a tank onto the ground, the improved system comprising a retaining dike extending around the tank and spaced outwardly therefrom, a liquefied gas collection shaft for removing the liquefied gas from the area between the dike and the tank, and a cover formed at least partially over the liquefied gas discharged from said tank in the area between the tank and said dike, said cover including a plurality of plastic balls normally positioned on the floor defined between said tank and said dike, said balls floating on liquefied gas discharged from said tank to thereby minimize surface area exposure of the liquefied gas.

15. A system in accordance with claim 14 wherein said collection shaft extends a substantial distance below ground level, an underground liquefied gas collection chamber communicating with said collection shaft, and a drainage gutter spaced inwardly of said dike, said gutter sloping downwardly toward said collection shaft whereby liquefied gas discharged from the tank is directed to said shaft.

16. A system in accordance with claim 15 wherein the surface defined between said tank and said dike comprises an insulating surface adapted to minimize heat transfer between liquefied gas on the surface and the underlying ground.

17. A system in accordance with claim 16 wherein said surface comprises an essentially smooth surface to thereby minimize disruption in the flow of liquefied gas from the tank toward said dike.

18. A system in accordance with claim 17 including gate means normally providing a gas-tight seal between said collection shaft and the area between said tank and said dike, inert gas located in said collection shaft, and means for opening said gates when liquefied gas enters said area whereby the liquefied gas encounters inert gas when entering said collection shaft.

19. A system in accordance with claim 18 including a pipe extending from said chamber upwardly, the passage defined by said pipe communicating with the atmosphere above the ground, said pipe being adapted to vent vaporized liquefied gas from within said chamber.

20. In a system wherein liquefied gas is stored in a tank at substantially ground level, the improvement in means for minimizing passage of gas into the atmosphere in the event liquefied gas is discharged from a tank onto the ground, the improved system comprising a retaining dike extending around the tank and spaced outwardly therefrom, a liquefied gas collection shaft defining an inlet and positioned in the area between the dike and the tank, said collection shaft extending a substantial distance below ground level, and an underground liquefied gas collection chamber communicating with said collection shaft, said collection chamber being dimensioned to at least temporarily receive the liquefied gas discharged from the tank, and including gate means normally providing a gas-tight seal between said collection shaft and the area between said tank and said dike, inert gas located in said collection shaft, and means for opening said gates when liquefied gas enters said area whereby the liquefied gas encounters inert gas when entering said collection shaft.

* * * * *